United States Patent Office 2,813,820
Patented Nov. 19, 1957

2,813,820

ANTIBIOTIC COMPOSITIONS CONTAINING OXYTETRACYCLINE AND POLYMYXIN

Arthur R. English, East Meadow, and Jasper H. Kane, Garden City, N. Y., assignors to Chas. Pfizer & Co., Inc., Brooklyn, N. Y., a corporation of Delaware No Drawing. Application August 12, 1952,
Serial No. 303,998

8 Claims. (Cl. 167—65)

This application is concerned with certain compositions which are useful as therapeutic agents. In particular it is concerned with compositions of the antibiotics, oxytetracycline (also known by the registered trademark "Terramycin") and polymyxin.

Oxytetracycline is a highly useful antibiotoc which is particularly active against a variety of gram-negative and gram-positive microorganisms and certain rickettsia. Polymyxin is a complex of antibiotics, the most useful of which is polymyxin B. This compound also displays considerable activity against various microorganisms.

We have found that compositions containing an oxytetracycline antibiotic and a polymyxin antibiotic are highly effective therapeutic agents. In fact, compositions of this nature exert an effect upon certain disease-producing organisms that is not exerted to the same degree or in the same manner by either an oxytetracycline antibiotic or a polymyxin antibiotic alone. This activity is particularly notable in certain diseases in human beings, specifically, in such infections as conjunctivitis, where compositions containing both oxytetracycline and polymyxin are more effective than either of the antibiotics alone. Polymyxin not only extends the already broad spectrum of oxytetracycline, but it also coacts with the latter antibiotic in an unusual fashion to yield compositions which are more useful than the individual antibiotics against certain diseases of animals and humans.

By "oxytetracycline antibiotic" we mean any of the various therapeutically effective forms of the antibiotic, such as amphoteric oxytetracycline, oxytetracycline hydrochloride, salts of oxytetracycline with other acids, and metallic salts of oxytetracycline, e. g. sodium, potassium and like salts. When reference is made to a "polymyxin antibiotic," there is meant one or more of the antibiotics produced by Bacillus polymyxa or Bacillus aerosporus. In particular, we find that polymyxin B, possessing a low degree of toxicity, is especially useful for the compositions of this invention. Polymyxin may be used as either the basic polypeptide or, preferably, as one of its salts, such as the sulfate which is commonly marketed.

The compositions of this invention may contain an oxytetracycline antibiotic and a polymyxin antibiotic in various proportions. However, we prefer to utilize a major proportion of an oxytetracycline antibiotic, together with a minor proportion of a polymyxin antibiotic. In general, compositions containing at least about one part by weight of an oxytetracycline antibiotic with one part by weight of a polymyxin antibiotic are quite useful, and proportions of as high as 20 to 1 can be used successfully.

A variety of dosage forms of the polymyxin-oxytetracycline compositions may be prepared. For instance, the dry mixture may be placed in gelatin capsules for administration orally in various infections, particularly those of the intestinal tract. The compositions may be prepared in the form of otic solutions for treatment of infections of the ear, for instance, a composition containing 5 mgs. of oxytetracycline hydrochloride and 10,000 units of polymyxin B sulfate (1.0 mg.) per cc. of 75% propyleneglycol is a particularly desirable form of the compositions of this invention. Nasal solutions may be prepared with similar compositions. This applies also to ophthalmic solutions which may be prepared containing sodium borate and sodium chloride, together wtih the two antibiotics. Ophthalmic ointments in various bases normally used for the preparation of such materials, e. g. petrolatum, may be prepared containing the antibiotic compositions of this invention. Powders for treatment of topical infections which are particularly susceptible to the compositions of this invention may be prepared containing, for instance, 30 mgs. of oxytetracycline hydrochloride and 10,000 units of polymyxin B sulfate per gram of a β-lactose base.

The compositions of this invention may be prepared in dry form or in solution. In general, the stability of such preparations is quite good. The solutions in aqueous media are desirably refrigerated while in liquid form, and they maintain their potency quite well for several days, but fresh preparations should be prepared if it is desired to prolong the treatment.

It has been shown in clinical testing that an ointment containing the oxytetracycline-polymyxin composition is unexpectedly valuable in the treatment of conjunctivitis; in particular, in the eye infection known as Koch-Weeks conjunctivitis which is epidemic in certain parts of the Orient on a seasonal basis. For instance, in a patient infected in both eyes, the use of an oxytetracycline ointment in the right eye, caused improvement, but the eye was not free of microorganisms after seven days' treatment; whereas the left eye, treated with the oxytetracycline-polymyxin composition, was cured, both clinically and bacteriologically, after three days' treatment. Polymyxin alone also does not bring about the same effect as the polymyxin-oxytetracycline composition. In five cases where infection occurred in both eyes, the right eye was treated with 0.5% of streptomycin and the left eye was treated with the polymyxin-oxytetracycline ointment. Although response was similar, it was found that discontinuance of treatment after three days resulted in a relapse of the streptomycin-treated eye, while no relapse occurred in the oxytetracycline-polymyxin treated eyes. It has been concluded that the polymyxin-oxytetracycline composition is an excellent agent for the treatment of the Koch-Weeks' infection (seasonal conjunctivitis). The composition is also useful in the treatment of trachoma.

What is claimed is:

1. A therapeutically effective composition, which contains as the principal active ingredients between 1 and 20 parts by weight of an oxytetracycline antibiotic to one part by weight of a polymyxin antibiotic.

2. A composition as claimed in claim 1 wherein the polymyxin antibiotic is polymyxin B.

3. A composition as claimed in claim 1, which comprises a major proportion of an oxytetracycline antibiotic, together with a minor proportion of polymyxin B.

4. A therapeutic composition, which contains as the principal active ingredients a major proportion of oxytetracycline hydrochloride and a minor proportion of polymyxin B sulfate.

5. A therapeutic composition comprising propyleneglycol, about 5 mg. of oxytetracycline and about 10,000 units of polymyxin B sulfate per cc. of solution.

6. A therapeutic composition comprising a powdered carrier, about 30 mg. of oxytetracycline and about 10,000 units of polymyxin B sulfate per gram of said carrier.

7. A therapeutic composition comprising petrolatum, about 30 mg. of oxytetracycline and about 10,000 units of polymyxin B sulfate per gram of said petrolatum.

8. A therapeutic composition comprising petrolatum, about 5 mg. of oxytetracycline and about 10,000 units of polymyxin B sulfate per gram of said petrolatum.

References Cited in the file of this patent

UNITED STATES PATENTS 2,680,701    Cusumano _____ June 8, 1954

OTHER REFERENCES

Neter et al. "Synergistic Effects of Polymyxin B and Terramycin on Bacteria Encountered in Urinary Tract Infections," J. Urol. 67(5):773–775, May 1952. Thru Biol. Abstr., November 1952, p. 2807.

Hobby et al.: "The Tuberculostatic Activity of Terramycin," Am. Rev. Tuberc., vol. 63, pp. 434–440, April 1951, through Squibb Abstract Bulletin, vol. 24, No. 17, Apr. 25, 1951, p. A–362.

Science News Letter, "New Antibiotic is Potent," Mar. 20, 1948, p. 179.

Armstrong: "Effect of Combinations of Antibiotics," J. Lab. and Clin. Med., vol. 37, April 1951, pp. 584–592.

Welch: "The Effect of Streptomycin-Bacitracin-Polymyxin Combination . . .," J. Am. Pharm. Assoc. (Sci. Ed.), September 1950, pp. 486–489.

Price et al.: Am. J. Public Health, March 1949, pp. 340–344.

Welch et al.: "Comparative Studies on Terramycin and Aureomycin," J. Am. Pharm. Assoc., Sci. Ed., April 1950, pp. 185–192.

Weyer: "Report on Terramycin," J. A., Pharm. Assn., vol. 11, April 1950, Practical Pharm. Ed., pp. 230 and 231, esp. p. 231, "Comparative Studies on Terramycin and Aureomycin."

Abraham: "New Antibiotics," J. Pharm. and Pharmacol., May 1951, pp. 257–270, esp. at pp. 262, 263.

Dearing: "Effect of Terramycin," Proc. Staff Meetings Mayo Clinic, Jan. 31, 1951, pp. 49–52.

DTN (Drug Trade News), "Terramycin and Aureomycin Hit Gonorrhea," Apr. 30, 1951, p. 42.